United States Patent [19]

Seita et al.

[11]  4,189,540

[45]  Feb. 19, 1980

[54] PROCESS FOR PRODUCING CATION EXCHANGE MEMBRANE BY IMPREGNATING A DIENE MONOMER HAVING CARBOXYLIC ACID GROUPS INTO A FLUORINATED MEMBRANE HAVING CATION EXCHANGE GROUPS AND POLYMERIZING

[75] Inventors: Toru Seita; Kenji Takahashi; Shunichi Asami; Akihiko Shimizu, all of Shin-nanyo, Japan

[73] Assignee: Toyo Soda Manufacturing Co., Ltd., Yamaguchi, Japan

[21] Appl. No.: 4,535

[22] Filed: Jan. 18, 1979

[30] Foreign Application Priority Data

Feb. 8, 1978 [JP] Japan ................................. 53-12295

[51] Int. Cl.$^2$ .................... C08F 259/08; C08F 265/02; C08F 273/00; C08J 5/22
[52] U.S. Cl. .......................................... 521/27; 521/31; 204/296
[58] Field of Search ..................................... 521/27, 31

[56] References Cited

U.S. PATENT DOCUMENTS 3,647,086   3/1972   Mizutani et al. ...................... 521/27
3,784,399   1/1974   Grot ........................................ 521/27
4,132,682   1/1979   Seita et al. ............................. 521/27

*Primary Examiner*—Joseph L. Schofer
*Assistant Examiner*—Peter F. Kulkosky
*Attorney, Agent, or Firm*—Oblon, Fisher, Spivak, McClelland & Maier

[57]  ABSTRACT

A cation exchange membrane is produced by impregnating a diene derivative having carboxylic acid group and/or carboxylic acid convertible group into a cation exchange membrane of a fluorinated polymer having at least one type cation exchange groups having lower acidity than that of sulfonic acid group wherein a ratio of sulfonic acid groups to total cation exchange groups on one surface (A surface layer) is higher than that of the other surface (B surface layer); performing a partial polymerization of the diene derivative and dipping the resulting membrane into an organic solvent which is miscible with water and has a boiling point of higher than 30° C. at 760 mmHg; holding the membrane between a pair of smooth plates; and heating the membrane at 50° to 180° C.; and if the diene derivative having carboxylic acid convertible group is used, converting said groups into carboxylic acid groups.

12 Claims, No Drawings

4,189,540

PROCESS FOR PRODUCING CATION EXCHANGE MEMBRANE BY IMPREGNATING A DIENE MONOMER HAVING CARBOXYLIC ACID GROUPS INTO A FLUORINATED MEMBRANE HAVING CATION EXCHANGE GROUPS AND POLYMERIZING

BACKGROUND OF THE INVENTION

The present invention relates to a cation exchange membrane having excellent electrochemical characteristic, cation selective permeability, chemical resistance, heat resistance and mechanical resistance and a process for producing the same. More particularly, it relates to a cation exchange membrane suitable for an electrolysis of an alkali metal halide and a process for producing the same.

Various kinds of cation exchange membranes have been proposed since an electrolysis using an ion exchange membrane has been developed as an important process. However, a cation exchange membrane having satisfactory cation selective permeability, durability and electrical characteristics has not found yet.

The conventional cation exchange membranes have suitable permeation inhibiting property to most of anions, however they have disadvantage of low cation transport number in the case of an aqueous solution of an electrolyte forming hydroxyl ions in comparison with the other case.

This is serious problem since a current efficiency is low when the cation exchange membrane is used in the condition including hydroxyl ions such as a membrane for an electrolysis of sodium chloride.

It has been desired to develop a cation exchange membrane having excellent durability and excellent permeation inhibiting property to anions including hydroxyl ions on the applications of the cation exchange membrane for said purposes.

The inventors have studied from these viewpoints and have found to provide excellent cation exchange membrane.

SUMMARY OF THE INVENTION

It is an object of the present invention to provide a process for producing a cation exchange membrane having high selective permeability, durability which imparts excellent current efficiency and low cell voltage in an electrolysis.

The foregoing and other objects of the present invention have been attained by providing a process for producing a cation exchange membrane which comprises impregnating a diene derivative having carboxylic acid group and/or carboxylic acid convertible group into a cation exchange membrane of a fluorinated polymer having at least one type cation exchange groups having lower acidity than that of sulfonic acid group wherein a ratio of sulfonic acid groups to total cation exchange groups on one surface (A surface layer) is higher than that of the other surface (B surface layer); performing a partial polymerization of the diene derivative and dipping the resulting membrane into an organic solvent which is miscible with water and has a boiling point of higher than 30° C. at 760 mmHg; holding the membrane between a pair of smooth plates; and heating the membrane at 50° to 180° C.; and if the diene derivative having carboxylic acid convertible group is used, converting said groups into carboxylic acid groups.

DETAILED DESCRIPTION OF THE PREFERRED EMBODIMENTS

In the embodiment of the present invention, a cation exchange membrane is produced by impregnating a diene derivative having carboxylic acid group and/or carboxylic acid convertible group into a cation exchange membrane of a fluorinated polymer having sulfonic acid group and one or more type cation exchange groups having lower acidity than that of sulfonic acid group wherein a ratio of sulfonic acid groups to total cation exchange groups on one surface (A surface layer) is higher than that of the other surface (B surface layer); performing a partial polymerization of the diene derivative and dipping the resulting membrane into an organic solvent which is miscible with water and has a boiling point of higher than 30° C. at 760 mmHg; holding the membrane between a pair of smooth plates; and heating the membrane at 50° to 180° C.; and if the diene derivative having carboxylic acid convertible group is used, converting said groups into carboxylic acid groups.

In the embodiment, the cation exchange membrane of a fluorinated polymer having at least one type cation exchange groups having lower acidity than that of sulfonic acid group is used.

The cation exchange group having lower acidity can be carboxylic acid group, phosphoric acid group phosphorous acid group, alcoholic or phenolic hydroxyl group, SH group, sulfinic acid group and N-mono-substituted sulfamide group.

In the embodiment, the cation exchange groups are preferably a combination of sulfonic acid groups and the weak acidic groups selected from the group consisting of carboxylic acid group, phosphoric acid group, phosphorous acid group, alcoholic or phenolic hydroxyl group, SH group, sulfinic acid group and N-mono-substituted sulfamide group.

The preparation of the cation exchange membrane will be illustrated.

The fluorinated polymers used for preparing the cation exchange membrane of the present invention are preferably perfluorocarbon polymers but can be other polymer having fluorocarbon bonds.

The cation-exchange capacity of the membrane is usually 0.3 to b 2.0 meq/g.dry.resin as sulfonic acid groups, 0.2 to 3.0 meq/g.dry.resin as carboxylic acid groups and 0.2 to 3.0 meq/g.dry.resin as phosphoric acid group.

The fluorinated polymer has not crosslinkage whereby it is relatively swollen with a conjugated diene derivative or a nonconjugated diene derivative or an organic solvent. Accordingly, it is preferable to use said copolymers for fabricating a membrane used in the present invention.

The membrane of the fluorinated polymer can be reinforced with polytetrafluoroethylene fiber.

In the embodiment, the following cation exchange membranes are preferably used.

(1) Cation exchange membrane having the B layer including —SO$_2$NMR{M is H or alkali metal atom or ammonium group; R is —C$_n$H$_{2n+1}$(n=0 to 6), —C$_m$H$_{2m}$COOM (m=1 to 8) or phenyl group or

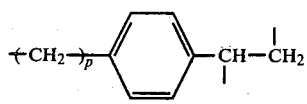

(p=0 to 3)} and the residual part including —SO$_3$M(M is defined above).

Copolymers having the following units are preferably used for the cation exchange membrane (1).

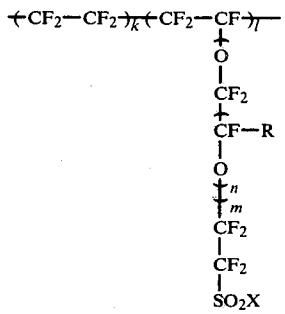

R = —CF$_3$, —CF$_2$—O—CF$_3$;
n = 0 or 1~5;
m = 0 or 1;
K/l = 3–16 preferable 5–13
X = F or Cl; especially,

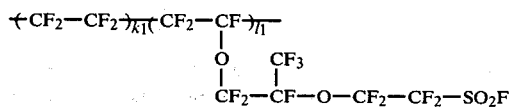 (1)

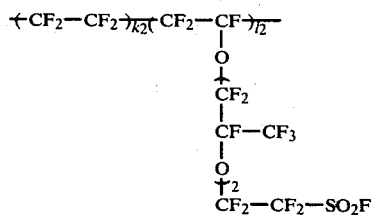 (2)

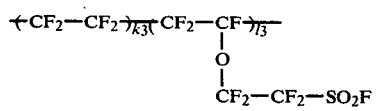 (3)

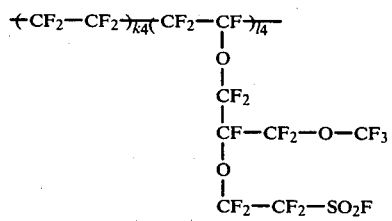 (4)

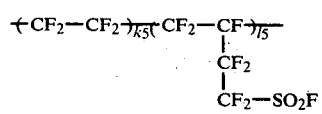 (5)

It is preferable to use the copolymer having 700 to 2800 g of a weight of the resin per 1 equivalent of sulfonyl halide group (hereinafter referring to as EW=700 to 2800 etc.), preferably EW=1000 to 1500.

The units (1) are the optimum.

The cation exchange membrane is obtained by reacting only one surface of the membrane of the fluorinated polymer with an amine having the formula

{R is —C$_n$H$_{2n+1}$(n=0 to 6), —C$_m$H$_{2m}$COOM (m=1 to 8) phenyl group or

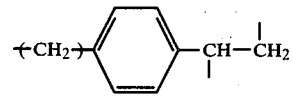

(p=0 to 3)}.

Suitable amines include ammonia gas, methylamine, ethylamine, n-propylamine, aminoacetic acid, 2-aminopropionic acid, 7-aminoheptanoic acid, aniline, and aminostyrene adduct.

(2) Cation exchange membrane having the B layer including —O—CF$_2$—COOM (M is H or alkali metal atom or ammonium group) and the residual part including —O—CF$_2$—CF$_2$—SO$_3$M (M is defined above).

Such cation exchange membranes can be obtained by treating one surface of the membrane having the units selected from (1) to (5) with a reducing agent or by reacting pyridine with one surface and hydrolyzing it and treating with HBr/phenol mixture.

(3) Cation exchange membrane having the B layer including —O—CF$_2$—COOM or

—O—CF$_2$—CF$_2$—SO$_2$NH—⟨phenyl⟩ and the residual part including —O—CF$_2$—CF$_2$—SO$_3$M (M is defined above).

Such cation exchange membranes can be obtained by reacting aniline/pyridine with one surface of the membrane having the units selected from (1) to (5) and hydrolyzing it and treating with HBr/phenol mixture under controlling the reaction so as to convert only surface layer to have —O—CF$_2$COOM (M is as defined above) to remain —O—CF$_2$—CF$_2$—SO$_2$NH—⟨phenyl⟩ in the inner part.

If necessary, the membrane is hydrolyzed to prepare a cation exchange membrane used for the process of the present invention.

On the other hand, the diene derivatives used for impregnating and polymerizing, are as follows.

Suitable diene monomers include

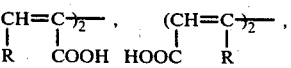

-continued

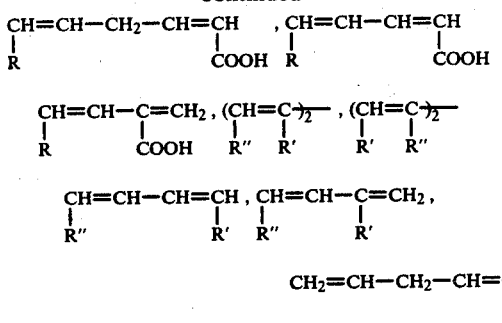

wherein R represents hydrogen atom, halogen atom, carboxylic acid group or a $C_1$-$C_5$ alkyl group; R' represents COOCl, CN, COOR''' or CONHR'''; R'' represents hydrogen or halogen atom or a $C_1$-$C_5$ alkyl group; and R''' represents a $C_1$-$C_5$ alkyl group. The carboxylic acid convertible group R' can be converted into carboxylic group after a polymerization.

The membrane of the fluorinated polymer can be used in the following three conditions.

(1) The membrane is swollen with an organic solvent and then the organic solvent is removed.

(2) The membrane is swollen with an organic solvent and then, the membrane is heated.

(3) The membrane is not treated with an organic solvent as (1) or (2).

In the case (1), the organic solvents used in the treatment of the present invention should swell the membrane treated and have a solubility in water more than 0.1 g/100 g $H_2O$ and a boiling point of 30° to 100° C. and are preferably the organic solvents which rapidly swell the membrane and are easily vaporized so as to be removed from the membrane.

Suitable water miscible organic solvents include aliphatic monohydric alcohols such as methanol, ethanol, propanol, butanol; ketones such as acetone, methyl ethyl ketone, esters such as methyl acetate, ethyl acetate, ethers such as ethyl ether, propyl ether, tetrahydrofuran, dioxane and chloroform.

The organic solvents can be used as mixtures.

In the case (2), the water miscible organic solvent is used to swell the membrane and then, the membrane is heated.

The heat treatment is carried out by a method of treating the swollen membrane in hot air or a method of heating the membrane held between a pair of smooth plates such as glass plate, polytetrafluoroethylene plate and stainless steel plate.

The heat treatment can be carried out at 60° to 120° C. for 30 minutes to 30 hours.

When the diene derivative is impregnated into one of the three kinds of the cation exchange membranes, the impregnation is carried out at 0° to 100° C. preferably 20° to 80° C. for 5 minutes to 5 days.

In the impregnation of the diene derivative into the cation exchange membrane, suitable solvent can be used.

Suitable solvents include aliphatic monohydric alcohols such as methanol and ethanol; ketones such as acetone, methylethyl ketone and diethyl ketone; esters such as methyl acetate and ethyl acetate; ethers such as ethyl ether, propyl ether, tetrahydrofuran and dioxane and chloroform. The solvents can be used as mixtures.

The partial polymerization after the impregnation can be carried out by a radical polymerization in the presence of a radical initiator such as azobisisobutyronitrile; a photopolymerization with a sensitizer such as benzophenone; a thermal polymerization; or a high energy radiation induced polymerization with γ-rays or electron rays, etc.

The partial polymerization is carried out at 40° to 150° C. for 5 minutes to 10 hours.

The cation exchange membrane having partially polymerized diene derivative is dipped in an organic solvent and heat-treated. The organic solvents used in the treatment have a solubility in water more than 0.1 g/100 g.$H_2O$ and a boiling point of higher than 30° C.

Suitable organic solvents for the post-treatment include aliphatic monohydric alcohols such as methanol and ethanol; ketones such as acetone, methylethyl ketone and diethyl ketone; esters such as methyl acetate, and ethyl acetate; ethers such as ethyl ether, propyl ether, tetrahydrofuran and dioxane; chloroform, ethyleneglycol, propyleneglycol, isopropyleneglycol and butanediols such as 2,3-butanediol; pentanediols such as 1,5-pentanediol; and hexanediols such as 1,6-hexanediol and glycerin.

The organic solvents can be used as mixtures.

In the treatment, the cation exchange membrane can be dipped in an organic solvent. The time for the dipping is depending upon a kind of the organic solvent and is enough to be 2 to 30 hours.

The organic solvent can be heated at up to a boiling point of the organic solvent.

In the heat treatment, the cation exchange membrane is held between a pair of smooth plates and heated at 50° to 180° C. for 30 minutes to 30 hours.

The smooth plates can be glass plate, stainless stell plate, polytetrafluoroethylene plates.

When the diene derivative having a carboxylic acid convertible group R' is used as the monomer, R' can be converted into carboxylic acid group by a hydrolysis.

The invention will be further illustrated by certain examples which are provided for purposes of illustration only and are not intended to be limiting in any manner.

EXAMPLE 1

A membrane of a copolymer of $CF_2=CF_2$ and

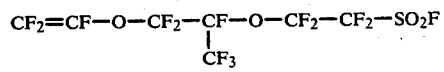

(EW=1200 and thickness of 5 mils) was fabricated in a form of a bag. Then, nitrogen gas was charged in the bag and purged in vacuum and a gaseous methylamine was charged under the pressure of about 1 atm. and the bag was kept for 20 minutes and the gas was purged in vacuum and nitrogen was passed and the bag was washed with water. It was confirmed by a coloring test that methylamine was reacted in a thickness of 1.7 mils from the surface. The membrane was hydrolyzed by dipping into 15% KOH/30% DMSO at 60° C. for 6 hours and then, the membrane was treated in 1 N-HCl at 90° C. for 16 hours to convert the sodium form into H-form.

The resulting cation exchange membrane was dipped into methanol for 5 hours at room temperature and the membrane was held between a pair of glass plates and methanol in the membrane was removed in vacuum. The membrane was dipped into a solution of butadiene- 1-carboxylic acid in an ether (35 wt.%) for 2 days. After taking up the membrane, the surfaces of the membrane were wiped off and the membrane was held between a pair of glass plates and heated at 80° C. for 3 hours to perform a partial polymerization of the monomer and the membrane was dipped into ethanol at room temperature for 2 hours and the membrane was held between a pair of glass plates and heated at 95° C. for 4 hours.

The resulting cation exchange membrane was used as a membrane for partitioning an anode compartment and a cathode compartment (the amine reacted layer faces to the cathode compartment) to prepare an electrolytic cell having effective area of 30 cm×30 cm.

An aqueous solution of sodium chloride was fed into the anode compartment and a concentration of sodium hydroxide was maintained to 20 wt.% and a current was passed at a current density of 30 A/dm$^2$ and a current efficiency and a cell voltage were determined.

The current efficiency was 92% and the cell voltage was 3.7 V.

Incidentally, a current efficiency of the non-treated cation exchange membrane by the process of this example was 82% and a cell voltage was 3.9 V.

EXAMPLE 2

The H-form cation exchange membrane of Example 1 was dipped into propanol at room temperature for 10 hours and the membrane was held between a pair of glass plates and heated at 90° C. for 5 hours and propanol in the membrane was removed. The treated membrane was dipped into a solution of butadiene-1-carboxylic acid in ether (30 wt.%) for 2 days. After taking up, the surfaces of the membrane were wiped off and the membrane was held between a pair of glass plates and heated at 85° C. for 2 hours to perform a partial polymerization of the monomer.

The membrane was dipped into methanol at room temperature for 2 hours and taken up and was held between a pair of glass plates and heated at 95° C. for 4 hours.

A current efficiency of the resulting membrane under feeding the current by the process of Example 1 was 95% and a cell voltage was 3.8 V.

REFERENCE 1

A membrane of a copolymer of $CF_2=CF_2$ and

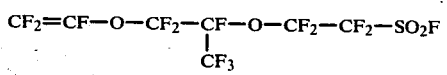

(EW=1200 and thickness of 5 mils) which was not treated with methylamine was treated by the process of Example 2 to obtain a cation exchange membrane.

A current efficiency of the resulting membrane under feeding the current by the process of Example 1 was 84% a cell voltage was 3.6 V.

EXAMPLES 3 TO 5

In accordance with the process of Example 2 except using the other medium instead of propanol and methanol, the cation exchange membrane was treated.

Current efficiencies and cell voltages of the resulting membrane under feeding the current by the process of Example 1 are shown in Table 1.

Table 1

| Example | Medium instead of propanol | Medium instead of methanol | Current efficiency (%) | Cell voltage (V) |
|---|---|---|---|---|
| 3 | ethylacetate | ethanol | 95 | 3.8 |
| 4 | tetrahydrofuran | ethyl acetate | 95 | 3.8 |
| 5 | acetone | tetrahydrofuran | 93 | 3.7 |

EXAMPLE 6

A membrane of a copolymer of $CF_2=CF_2$ and

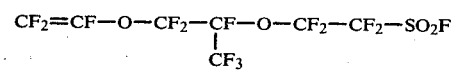

(EW=1500 and thickness of 2 mils) and a membrane of the same copolymer (EW=1100 and thickness of 4 mils) were reinforced by inserting a polytetrafluoroethylene fabric between the membranes under heat-bonding and then, methylamine gas was contacted with the surface of the membrane (EW=1500) for 30 minutes.

It was confirmed by a coloring test that methylamine was reacted in a thickness of 1.2 mils from the surface.

The membrane was hydrolyzed by dipping into 15% KOH/30% DMSO at 60° C. for 6 hours and then, treated in 1 N-HCl at 90° C. for 16 hours to convert the sodium form into H-form.

The H-form cation exchange membrane was treated by the process of Example 1.

The resulting cation exchange membrane was used as a membrane for partitioning an anode compartment and a cathode compartment (the amine reacted layer faces to the cathode compartment) to prepare an electrolytic cell having the effective area of 30 cm×30 cm.

An aqueous solution of sodium chloride was fed into the anode compartment and a concentration of sodium hydroxide was maintained to 25 wt.% and a current was passed at a current density of 30 A/dm$^2$ and a current efficiency and a cell voltage were determined.

The current efficiency was 93% and the cell voltage was 3.9 V. A current efficiency of the non-treated cation exchange membrane by the process of this example 1 was 84% and a cell voltage was 4.1 V.

EXAMPLE 7

The H-form cation exchange membrane of Example 6 was dipped into ethanol at room temperature for 10 hours and held between a pair of glass plates and heated at 100° C. for 2 hours to remove ethanol. The membrane was dipped into a solution of butadiene-1-carboxylic acid in ether (35 wt.%) for 1 day and taken up. The surfaces of the membrane were wiped and the membrane was held between a pair of glass plates and heated at 110° C. for 2 hours to perform a partial polymerization and then, dipped into propyleneglycol at room temperature for 1 day. After taking up, the membrane was held between a pair of smooth plates made of a glass plate, a rubber sheet and a polyester sheet and heated at 110° C. for 10 hours.

A current efficiency of the resulting cation exchange membrane under feeding the current by the process of Example 6 was 85% and a cell voltage as 3.5 V.

REFERENCE 2

The cation exchange membrane of Example 6 which was not treated with methylamine was treated by the process of Example 7.

A current efficiency of the resulting cation exchange membrane under feeding the current by the process of Example 6 was 72% and a cell voltage was 3.4 V.

REFERENCE 3

The H-form cation exchange membrane of Example 6 was dipped into a solution of butadiene-1-carboxylic acid in ether (35 wt.%) for 2 days. After taking up, the surfaces of the membrane was wiped off and held between a pair of glass plates and heated at 95° C. for 6 hours to perform a polymerization A current efficiency of the resulting cation exchange membrane under feeding the current by the process of Example 6 was 87% and a cell voltage was 4.0 V.

EXAMPLE 8

In accordance with the process of Example 6 except using n-propylamine instead of methylamine, the membrane was treated.

A current efficiency of the resulting cation exchange membrane under feeding the current by the process of Example 6 was 93% and a cell voltage was 3.8 V.

EXAMPLE 9

The cation exchange membrane of Example 6 was dipped into methanol at room temperature for 4 hours and the membrane was held between a pair of glass plates and heated at 120° C. for 1 hour to remove methanol. The membrane was dipped into a solution of

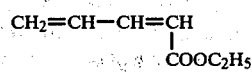

in methanol/ether (30 wt.%) for 1 day. After taking up, the surfaces of the membrane were wiped off and the membrane was held between a pair of glass plates and heated at 100° C. for 2 hours to perform a partial polymerization. The membrane was dipped into ethanol at 60° C. for 1 hour and held between a pair of glass plates and heated at 110° C. for 2 hours and the membrane was hydrolyzed in 10% NaOH/methanol (ratio of 1:1 by weight) at 80° C. for 15 hours.

A current efficiency of the resulting cation exchange membrane under feeding the current by the process of Example 6 was 94% and a cell voltage was 3.9 V.

EXAMPLE 10

A membrane of a copolymer of $CF_2=CF_2$ and

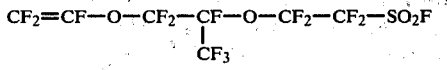

(EW=1500 and thickness of 2 mils) and a membrane of the same copolymer (EW=1100 and thickness of 4 mils) were reinforced by inserting polytetrafluoroethylene fabric between the membrane under heat bonding. The reinforced membrane was hydrolyzed in 10% NaOH/methanol (ratio of 1:1 weight) at 70° C. for 16 hours and was treated in 1 N-HCl at 90° C. for 16 hours to convert the sodium form into H-form.

The resulting cation exchange membrane was treated with a mixture of phosphorus pentachloride and phosphorus oxychloride (ratio of 1:1 by weight) to convert it into sulfonyl chloride form and the membrane was washed with $CCl_4$ and dried in vacuum.

The surface of membrane (EW=1500) was treated with pyridine for 30 hours to react it and the membrane was washed with acetone, washed with water and dried.

The membrane was hydrolyzed in 10% NaOH/methanol (ratio of 1:1 by weight) at 70° C. for 16 hours and then treated with 47% HBr/phenol mixture to convert into $-O-CF_2-COOH$.

The resulting cation exchange membrane was dipped into a solution of butadiene-1-carboxylic acid in ether (40 wt.%) for 1 day. The surfaces of the membrane were wiped off and held between a pair of glass plates and heated at 100° C. for 2 hours to perform a partial polymerization. The membrane was dipped into ethanol and held between a pair of glass plates and heated at 80° C. for 5 hours.

The resulting cation exchange membrane was used as a membrane for partitioning an anode compartment and a cathode compartment (the carboxylic acid group layer faces to the cathode compartment) to prepare an electrolytic cell having effective area of 30 cm × 30 cm.

An aqueous solution of sodium chloride was fed into the anode compartment and a concentration of sodium hydroxide was maintained to 35 wt.% and a current was passed at a current density of 30 A/dm² and a current efficiency were determined.

The current efficiency was 90% and the cell voltage was 4.0 V. A current efficiency of the non-treated cation exchange membrane by the process of this example was 86% and a cell voltage was 4.2 V.

EXAMPLE 11

The surface (EW=1500) of the sulfonylchloride form membrane of Example 10 was treated with pyridine for 20 hrs. and then treated with aniline for 101 hours and the membrane was washed with acetone and washed with water and dried.

The membrane was hydrolyzed in 10% NaOH/methanol (ratio of 1:1 by weight) at 70° C. for 16 hours and then, treated with 47% HBr/phenol mixture to convert

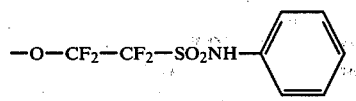

group in a surface layer into $-O-CF_2-COOH$ to remain partially

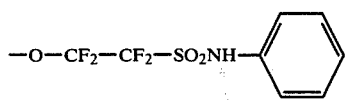

It was confirmed that the other layer has sulfonic acid group by infrared spectrum analysis.

The resulting cation exchange membrane was dipped in ethanol at room temperature for 20 hours and held between a pair of glass plates and heated at 110° C. for 1 hour.

The membrane was dipped into a solution of butadiene-1-carboxylic acid in ether (40%) for 2 days and taken up. The surfaces were wiped off and held between a pair of glass plates and heated at 110° C. for 1 hour to perform a partial polymerization and then dipped into glycerol. After taking up, the membrane was held between a pair of smooth plates made of a glass plate, a rubber sheet and a polyester sheet and heated at 110° C. for 15 hours.

A current efficiency of the resulting cation exchange membrane under feeding the current by the process of Example 10 was 93% and a cell voltage was 4.0 V.

A current efficiency of the non-treated cation exchange membrane under feeding the current by the process of Example 10 was 92% and a cell voltage was 4.5 V.

What is claimed is:

1. A process for producing a cation exchange membrane which comprises impregnating a diene derivative having carboxylic acid group and/or carboxylic acid convertible group into a cation exchange membrane of a fluorinated polymer having at least one type cation exchange groups having lower acidity than that of sulfonic acid group wherein a ratio of sulfonic acid groups to total cation exchange groups on one surface (A surface layer) is higher than that of the other surface (B surface layer); performing a partial polymerization of the diene derivative and dipping the resulting membrane into an organic solvent which is miscible with water and has a boiling point of higher than 30° C. at 760 mmHg and heating the membrane at 50° to 180° C.;

and if the diene derivative having carboxylic acid convertible group is used, converting said groups into carboxylic acid groups.

2. A process according to claim 1 wherein the B surface layer of the cation exchange membrane comprises $-O-CF_2-COOM$ (M represents H, an alkali metal atom or ammonium group) and the residual part comprises $-O-CF_2-CF_2-SO_3M$ (M is defined above).

3. A process according to claim 1 wherein the B surface layer of the cation exchange membrane comprises $-SO_2NMR$ {M represents H, an alkali metal atom or ammonium group and R represents $-C_nH_{2n+1}$ (n is 0 to 6); $-C_mH_{2m}COOM$ (m is 1 to 8; M is defined above), phenyl group or

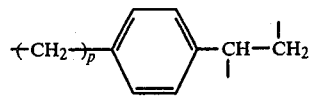

(p is 0 to 3) and the residual part comprises $-SO_3M$ (M is defined above)}.

4. A process according to claim 1 wherein the B surface layer comprises $-O-CF_2COOM$ (M is defined above) and

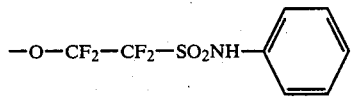

and the residual part comprises $-O-CF_2-CF_2-SO_3M$ (M is defined above).

5. A process according to claim 1 wherein the B surface layer comprises phosphoric acid group.

6. A process according to claim 1 wherein the cation exchange membrane consists of two parts having different ion exchange capacity and the B surface layer is in a side of the lower ion exchange capacity.

7. A process according to claim 1 wherein the cation exchange membrane is swollen in an organic solvent and the organic solvent was removed from the membrane before the treatment.

8. A process according to claim 1 wherein the cation exchange membrane swollen with an organic solvent is heat-treated before the treatment.

9. A process according to claim 7 or 8 wherein the cation exchange membrane is swollen before holding it between a pair of smooth plates.

10. A process according to claim 7 or 8 wherein the organic solvent has a solubility to water of more than 0.1 g/100 g.H$_2$O at room temperature.

11. A process according to claim 8 wherein the heat-treatment is performed at 60° to 120° C.

12. A process according to claim 1 wherein the diene derivative having carboxylic acid group or carboxylic acid convertible group is a conjugated or non-conjugated diene.

* * * * *